A. GREENWOOD.
ILLUMINATED DISPLAY APPARATUS.
APPLICATION FILED MAY 13, 1918.

1,384,753.
Patented July 19, 1921.
3 SHEETS—SHEET 1.

Inventor
Albert Greenwood
By Cyrus Kehr.
Attorney

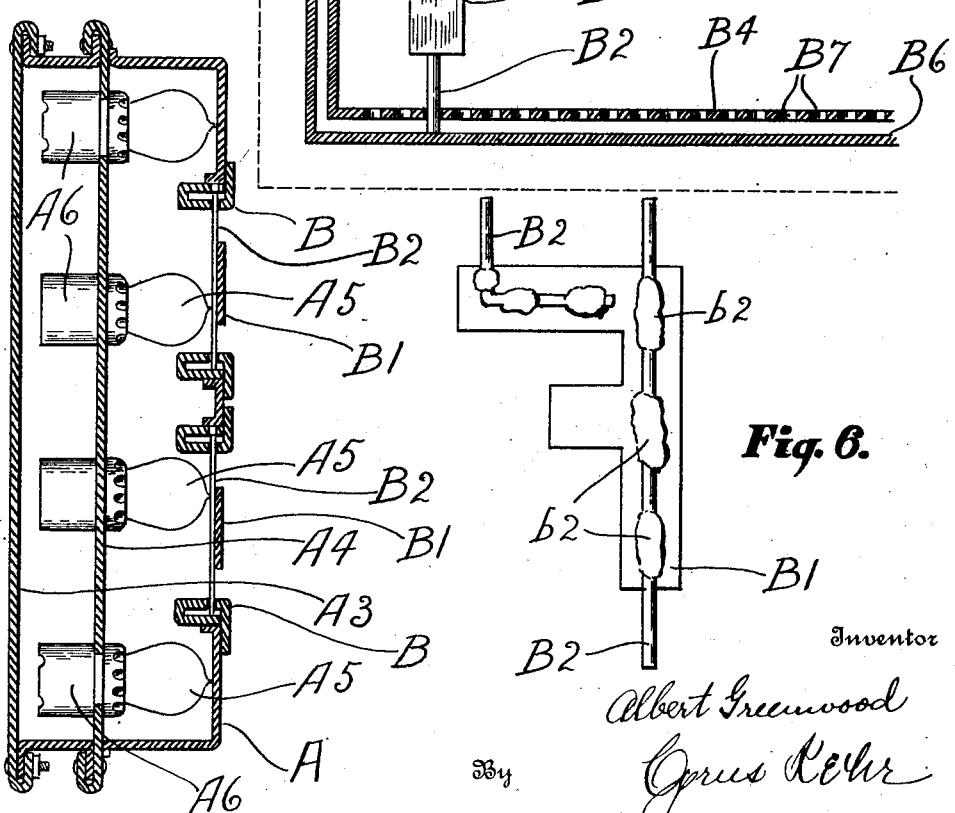

A. GREENWOOD.
ILLUMINATED DISPLAY APPARATUS.
APPLICATION FILED MAY 13, 1918.
1,384,753.
Patented July 19, 1921.
3 SHEETS—SHEET 3.
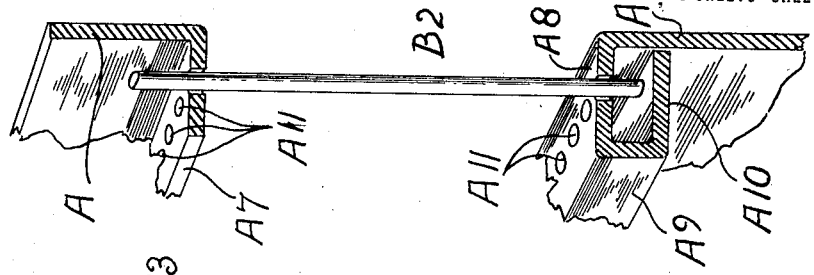
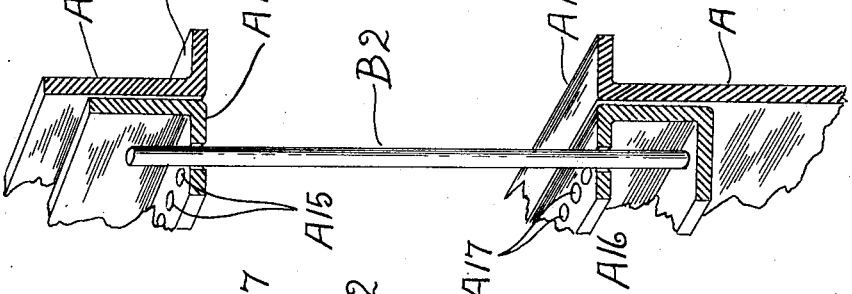
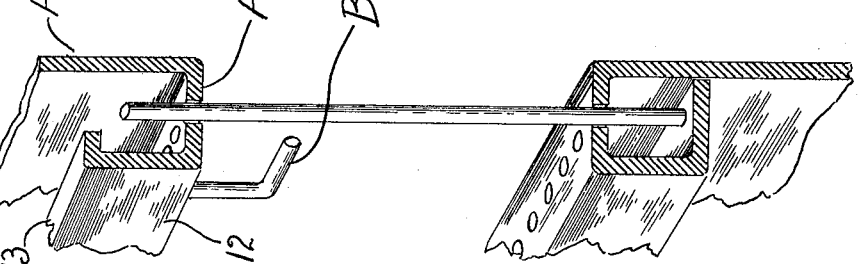
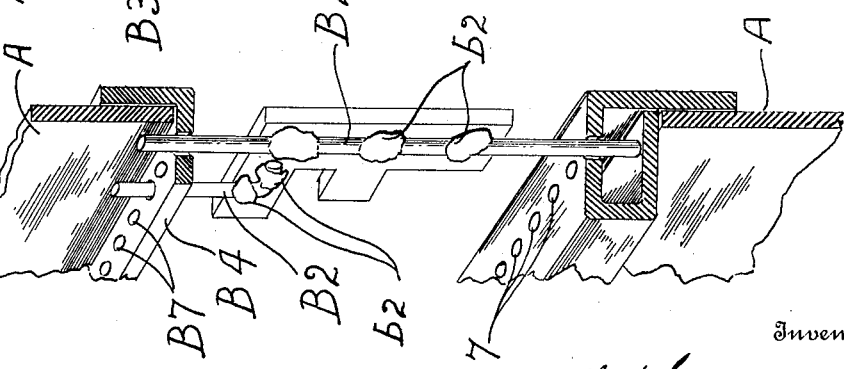
Inventor
Albert Greenwood
By
Cyrus K'Ehr
Attorney

ALBERT GREENWOOD, OF KNOXVILLE, TENNESSEE.

ILLUMINATED DISPLAY APPARATUS.

1,384,753.

Specification of Letters Patent.  Patented July 19, 1921.

Application filed May 13, 1918. Serial No. 234,293.

*To all whom it may concern:*

Be it known that I, ALBERT GREENWOOD, a citizen of the United States, residing at Knoxville, in the county of Knox and State of Tennessee, have invented a new and useful Improvement in Illuminated Display Apparatus, of which the following is a specification, reference being had to the accompanying drawing.

My improvement relates particularly to display apparatus into which various objects may be interchangeably placed for displaying. Among the objects of the improvement are the following:

(1) To provide an apparatus in which the objects to be displayed will receive good contrast with adjacent areas and in which the interchange of objects to be displayed may be made without removing or disturbing the lamps which produce the light used for internal illumination of the apparatus;

(2) To provide an apparatus which is adapted to satisfactorily display such objects by external as well as by internal illumination;

(3) To provide an apparatus adapted to embody simultaneously a plurality of display objects, and which, in the preferred form, may be arranged in a holder distinct from the body of the apparatus and the holder then put into suitable position in the body of the apparatus, whereby the changing of the objects will require a minimum of time and the substitution of the new objects in the holder may be effected at any convenient place out of public view, the body of the apparatus being usually too large for removal to a place out of public view;

(4) To produce an apparatus in which the objects to be displayed will be supported or positioned in the apparatus without the use of glass, whereby glass breakage involving loss of the value of the glass and the objects or representations of objects supported thereon is avoided and injury and damage resulting from the falling of pieces of glass is avoided;

(5) To provide such a structure in which the lamps furnishing the interior illumination are housed or sheltered against storm and against mechanical injury;

(6) To provide such a structure in which the interior reflecting surfaces are readily accessible for cleaning and renewing.

In the accompanying drawings,

Fig. 4 is a horizontal section on the line, 4—4, of Fig. 2;

Fig. 5 is an upright section on the line, 5—5, of Figs. 3 and 4, looking in the direction of the arrow;

Fig. 6 is a rear view of a letter the front of which is shown in Figs. 2 and 5;

Fig. 7 is an upright section on the line, 7—7, of Fig. 1, looking toward the right;

Fig. 8 is a detail sectional perspective showing the frame or holder in another form;

Figs. 9, 10 and 11 are detail sectional perspectives of forms omitting the removable frame or holder and having the edges of the front wall around the opening which forms the object field fitted to make direct engagement with the object supporting means.

Figure 1:
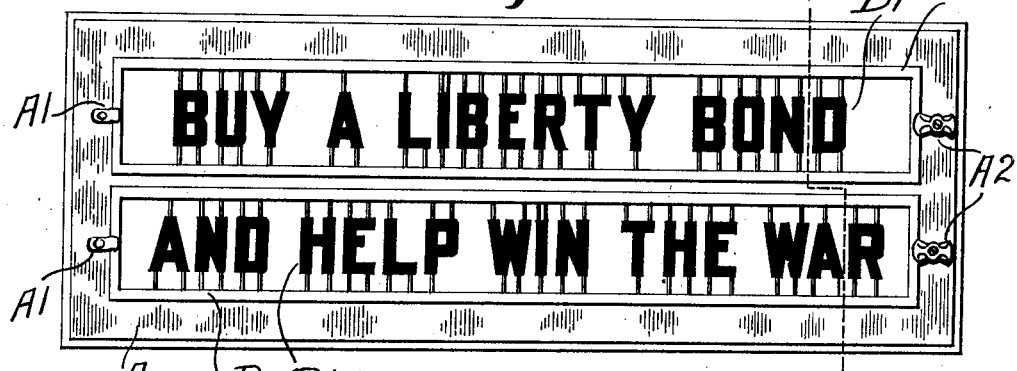
Figure 1 is a front elevation of an apparatus embodying my improvement.

Referring first to Figs. 1 and 7 of the drawings, A is the front wall of the body of the apparatus. This is in box form and is preferably built of sheet metal and has a back wall, $A^3$, and a partition, $A^4$, parallel to the back wall. Electric lamp sockets, $A^6$, are seated in said partition and support electric lamps, $A^5$. In the front wall of said body are two horizontal openings in each of which is an object field. In this particular form there is within each of these openings a frame or holder, B, which form the wall edge around said opening. The lamps, $A^5$, are placed behind the remaining parts of the front wall of the apparatus, in order that the lamps may not be seen, and in order that the lamps may not cast direct light from the apparatus to the observer, and in order that a surface receiving indirect light will make contrast with the object or objects in the object field.

The front face of the partition, $A^4$, is made white or of some color shade which is adapted to reflect light toward the front wall of the apparatus. Thus said wall becomes a reflecting wall.

The apparatus having two frames or holders, B, each being seated in an opening in the front wall, is shown in order that it may be seen how a plurality of lines of letters or other objects may be arranged in the same apparatus. These holders are to be regarded as parts of the edges of the wall surrounding the openings. Each such opening may be termed a display object field.

The display objects are made of such height as will leave spaces between the objects and the upper and the lower edges of the front wall, and at the ends of the opening a space is to be left between the edges of the front wall and the objects, in order that all parts of the objects may be brought into contrast with the reflecting wall.

Each frame or holder, B, is similar to a frame for holding a picture. In the form shown in the drawings, the frame is made of sheet metal. The body of the frame conforms to the opening in the front wall, A, of the apparatus, and a flange, $B^3$, extends outward from the frame or holder parallel to and over the front face of the front wall of the apparatus, whereby said holder is prevented from moving farther rearward into the apparatus. On the front wall, at one end of the holder is a bracket, $A^1$, projecting over the adjacent flange, $B^3$, of the holder. At the opposite end, a button, $A^2$, is swiveled on the outer face of the front wall of the apparatus and adapted to have one end extend over the flange, $B^3$, when the button is turned into the horizontal position. When the holder is to be inserted, it is presented against the front wall in front of the opening and far enough rightward of the final position to allow the flange, $B^3$, to be entered behind the bracket, $A^1$, by leftward movement of the holder. When that has been done, the entire holder is moved leftward and then rearward until all of the flange, $B^3$, bears against the front face of the front wall. Then the button, $A^2$, is turned to engage the adjacent part of said flange.

Figure 3:
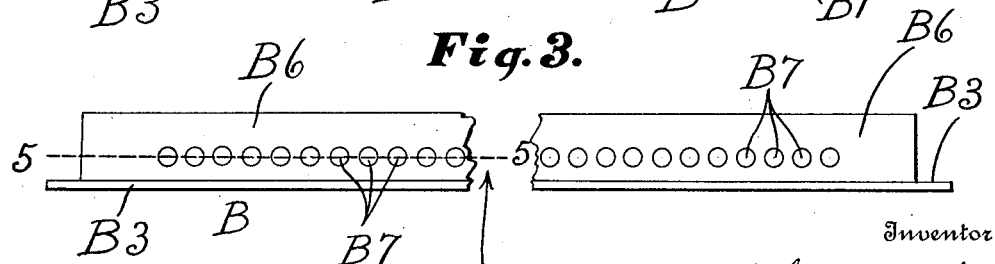
Fig. 3 is a plan of the frame or holder shown by Fig. 2.

The body of the frame or holder is formed to give strength to the holder and also to form horizontal rests to receive supporting members whereby the objects to be displayed are supported in the object field within the holder. For details of the construction of said body, reference is made to Figs. 3, 4 and 5. As appears in Fig. 4, the body of the frame or holder is hollow and is formed by bending a sheet of metal to provide the front flange, $B^3$, a wall, $B^4$, perpendicular to said flange, a rear wall, $B^5$, parallel to the flange, $B^3$, and a wall, $B^6$, extending forward from the rear wall, $B^5$, parallel to the wall, $B^4$. This construction affords rigidity and also provides a simple and effective means for supporting the objects which are to be displayed.

Figure 2:
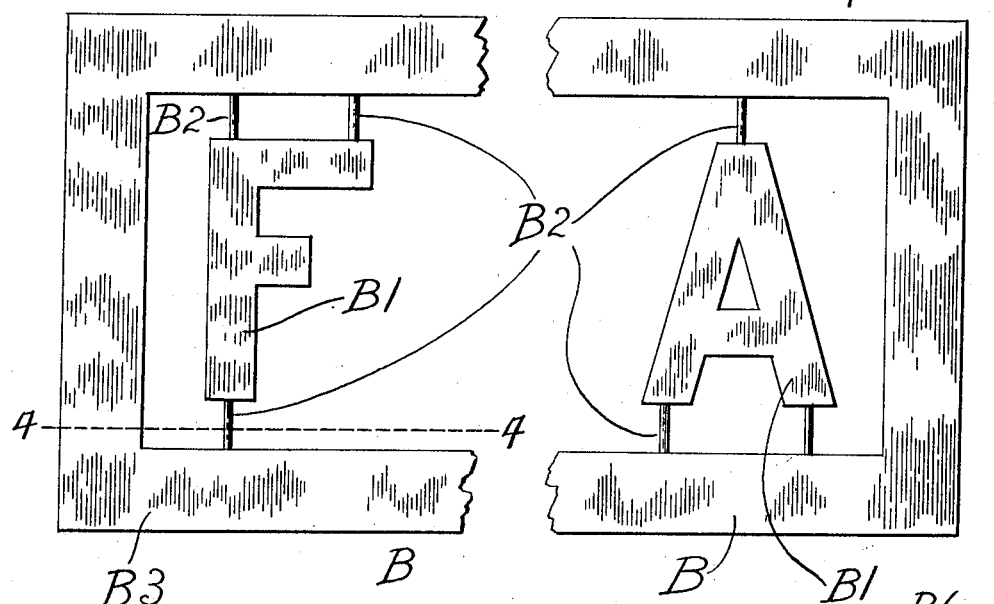
Fig. 2 is a front elevation of one of the object frames or holders, portions being broken away.

In the lower horizontal part of the holder, the wall, $B^4$, has a row of upright apertures, $B^7$; and in the upper horizontal part of the holder, the wall, $B^4$, and also the wall, $B^6$, have apertures in upright alinement with the apertures, $B^7$, of the lower part of the holder. The function of these apertures is to receive the ends of supporting members, $B^2$, which support the objects, $B^1$, which are to be displayed. In the left hand portion of Figs. 2 and 5, the object to be displayed is the letter, F. This consists of a piece of sheet metal cut to the form of that letter. To the back of the sheet metal forming said letter are secured two wires, $B^2$. One of said wires extends below said letter and into one of the apertures, $B^7$, while the other end of said wire extends above said letter into an aperture, $B^7$. The second of said wires is applied only to the upper end of said letter and extends upward into one of the apertures, $B^7$. Said wires are secured to the letter by means of masses of solder, $b^2$, (see Fig. 6). In the right hand part of Fig. 2, a member which is to represent the letter, A, is similarly supported by two lower wires and one upper wire, each extending into an aperture, $B^7$.

Fig. 1 shows a variety of letters, to some of which four and to others of which three such supports are applied. The letter, I, appears twice, and its narrow form would suggest that one upper and one lower support would be sufficient. But, since the wires used as such supports are cylindrical, two supports must be used at one end of the letter to prevent rotation of the letter.

The apertures, $B^7$, are spaced uniformly, and when two supports are projected from one end of a letter, said supports are separated by a space (from center line to center line) equaling the space between two adjacent apertures, $B^7$, or a multiple of said spaces. The lower ends of the supports, $B^2$, rest upon the lower wall, $B^6$, said wall having no apertures.

When an object, $B^1$, is to be put into the frame or holder, the upper support or supports are moved upward into apertures, $B^7$, in the upper wall, $B^4$, and then moved upward into the corresponding apertures in the upper wall, $B^6$, until the lower end of the lower support may move across the lower wall, $B^4$. Then said support is so moved into alinement with the appropriate aperture, $B^7$, and is then allowed to move downward into said aperture until the support rests upon the lower wall, $B^6$, the upper support or supports in the meantime moving downward. The upper supports are made long enough to remain in the apertures of the upper wall, $B^4$, when the lower wall support rests upon the lower, $B^6$. (See Fig. 5.)

When the letters or other objects which are in position in the apparatus for displaying are to be changed, the objects are removed by reversing the operation just described. Such insertion and removal may be effected when the frame or holder is in position in the body of the apparatus or when the holder has been removed from said body. The latter method is usually preferable because the apparatus will usually be located in a public place where it is undesirable to do such work; and such exchange can best be made when the holder can be handled independently of the body of the apparatus. A desirable course is to provide extra holders in which the new object or objects can be arranged at leisure and the holder then taken to the apparatus and put into position after removing the holder then in service.

By making a large number of apertures, $B^7$, in the holders, the objects, $B^1$, may be appropriately spaced from each other, as, for example, when letters are used to form words as shown in Fig. 1.

In order to make the supports, $B^2$, invisible, or as nearly so as may be, they should be made thin and of the same color as the reflecting front face of the partition, $A^4$. The objects, $B^1$, should be opaque or translucent to such degree as will permit good contrast of the object with the back ground formed by the front face of the partition, $A^4$. For ordinary purposes, such objects will be opaque; but in some cases it is desirable for artistic effect to make parts of the body translucent. Such effect can be enhanced by making gradual variations in the degree of translucency and by giving a variety of coloring to the objects.

In Fig. 8, the upper part of the frame or holder is formed without the walls, $B^5$ and $B^6$, of Fig. 4. This involves dispensing with the apertures in the wall, $B^6$.

In Fig. 9, the construction is similar to the construction in Fig. 8, but the frame or holder is omitted and the means for engaging the object supports are formed directly on the front wall of the body, A. At the upper part of the opening within which is the object field, the sheet metal is turned backward to form a horizontal flange, $A^7$, in which are apertures, $A^{11}$, corresponding to the apertures, $B^7$, in Fig. 8. At the lower edge of said opening, the sheet metal is folded backward to form an upper horizontal wall, $A^8$, an upright wall, $A^9$, extending downward from the wall, $A^8$, and a lower horizontal wall extending from the lower part of the wall, $A^9$, forward toward or to the wall, A. In the wall, $A^8$, are apertures, $A^{11}$, which correspond to the apertures, $B^7$, of the preceding figures.

In Fig. 10 the lower edge is formed the same as in Fig. 9; while at the upper edge a wall, $A^{12}$, rises from the rear part of the wall, $A^7$, and at the upper part of the wall, $A^{12}$, is a forward directed flange, $A^{13}$, between which and the wall, A, is a space through which the upper ends of the object supports, $B^2$, may rise.

In Fig. 11, the upper and the lower edges of the wall, A, are turned outward to form horizontal flanges, $A^{13}$. Along the upper part of said opening, an angle piece, $A^{14}$, is secured against the inner face of the wall, A, the horizontal part of the angle piece having apertures, $A^{15}$. Along the lower part of said opening, a channel piece, $A^{16}$, is applied to the inner face of the wall, A, the web of said channel piece being placed face-to-face against said wall, and the upper flange of the channel being provided with apertures, $A^{17}$, which receive the object supports, $B^2$. In this form the flanges, $A^{13}$, add stability to the metal which surrounds the opening in which is the object field.

While it is sought to produce an effective and pleasing display by internal illumination—the illumination produced by the electric lamps, $A^5$, hidden within the body of the apparatus, it is also sought to produce an effective and pleasing display of the same objects by external illumination during the absence of the internal illumination. My improved apparatus serves well under each of these conditions of illumination. During operation under each of these conditions, the apparatus shows nothing which suggests the other form of illumination. When the illumination is external, the lamps, $A^5$, are invisible and there is nothing in the apparatus to suggest unsuitability to external illumination; and when the internal illumination is used, there is nothing in the appearance of the apparatus to give the impression that the apparatus is to be used otherwise than by the internal illumination. Furthermore, the interchangeability of the display objects is not apparent to such extent as to render the apparatus inartistic. On the contrary, the apparatus appears to be of permanent form.

The display objects, $B^1$, are in about the same plane as a pane of glass would be if it were set in the opening in which the display objects are located. Hence from the distance at which the apparatus is usually observed, the impression is substantially the same as it would be if the objects were painted upon or otherwise applied to a pane of glass located in said opening.

When the display objects have been removed, the interior of the apparatus at the front of the partition, $A^4$, is accessible for cleaning or for renewing the reflecting surfaces by painting or otherwise.

I claim as my invention,

1. In an apparatus of the nature described, the combination of substantially opaque display objects, supporting means extending upward and downward from said display objects, and two superposed parallel members having along their length equally spaced recesses all adapted to receive any of said supporting means, substantially as described.

2. In an apparatus of the nature described, the combination of substantially opaque display objects, supporting means extending upward and downward from said display objects, and two superposed parallel members having along their length equally spaced recesses all adapted to receive any of said supporting means, and the lower of said members also comprising a horizontal wall which serves to limit the downward movement of the lower supporting members, substantially as described.

3. In an apparatus of the nature described, the combination of substantially opaque display objects, wires extending upward and downward from said display objects, and two superposed parallel members having along their length equally spaced recesses all adapted to receive any of said wires, substantially as described.

4. In an apparatus of the nature described, the combination of substantially opaque display objects, wires extending upward and downward from said display objects, and two superposed parallel members having along their length equally spaced recesses all adapted to receive any of said wires, and the lower of said members also comprising a horizontal wall which serves to limit the downward movement of the lower supporting wires, substantially as described.

5. In an apparatus of the nature described, the combination of a chambered body comprising a front wall having an opening the upper edge of which has a horizontal wall provided with a row of apertures and the lower edge of which is provided with two horizontal walls one of which is located above the other and which has a row of apertures and the lower of which forms a rest for the below-mentioned supporting means, a reflecting wall presenting a front reflecting surface back of said opening, lamps within said body behind the front wall, substantially opaque display objects in said opening clear of the edges of said body, and supporting means extending from said display objects across parts of the light field to the edges of said body and adapted to engage in said apertures, substantially as described.

6. In an apparatus of the nature described, the combination of a chambered body comprising a front wall having an opening the upper edge of which has a horizontal wall provided with a row of apertures and the lower edge of which is provided with two horizontal walls one of which is located above the other and which has a row of apertures and the lower of which forms a rest for the below-mentioned supporting wires, a reflecting wall presenting a front reflecting surface back of said opening, lamps within said body behind the front wall, substantially opaque display objects in said opening clear of the edges of said body, and supporting wires attached to said display objects and across parts of the light field to the edges of said body and adapted to engage in said apertures, substantially as described.

7. In an apparatus of the nature described, the combination of two horizontal and parallel apertured sheet metal walls, substantially opaque display objects adapted to be located in the object field between said walls and away from the latter, a horizontal supporting wall located below the lower of said apertured walls, lamps behind the plane of said object field, and supporting means extending from said objects across parts of the light field into engagement with the apertures of the apertured walls and resting on said horizontal supporting wall, substantially as described.

8. In an apparatus of the nature described, the combination of horizontal, stationary supports, substantially opaque display objects arranged relative to and away from said stationary supports, supports attached to the display objects and extending across parts of the light field, the supports of one kind having apertures adapted for the making of changeable interengagement with the supports of the other kind against horizontal movement, one of said stationary supports comprising a horizontal surface forming a rest for holding the display object supports against movement below the display position, and lamps behind the plane of the display objects, substantially as described.

In testimony whereof I have signed my name this 10th day of May, in the year one thousand nine hundred and eighteen.

ALBERT GREENWOOD.